United States Patent [19]

Ashida et al.

[11] Patent Number: 5,003,532
[45] Date of Patent: Mar. 26, 1991

[54] MULTI-POINT CONFERENCE SYSTEM

[75] Inventors: Youichi Ashida, Kawasaki; Yuji Yoshida, Yokohama; Hitoshi Ishiguro, Inagi; Hitoshi Sato, Tokyo; Hiroaki Natori, Kawasaki, all of Japan

[73] Assignee: Fujitsu Limited, Kawasaki, Japan

[21] Appl. No.: 531,455

[22] Filed: May 31, 1990

[30] Foreign Application Priority Data

Jun. 2, 1989 [JP] Japan .................................. 1-140637
Nov. 15, 1989 [JP] Japan .................................. 1-295118

[51] Int. Cl.⁵ ............................................ H04M 3/42
[52] U.S. Cl. ...................................... 370/62; 379/53;
379/205; 358/85
[58] Field of Search .................. 370/62; 379/202, 204,
379/205, 53, 158; 358/85, 84, 86; 455/5, 2

[56]       References Cited
       U.S. PATENT DOCUMENTS

| 4,540,850 | 9/1985 | Herr et al. | 370/62 |
| 4,650,292 | 3/1987 | Boerger et al. | 358/85 |
| 4,710,917 | 12/1987 | Tompkins et al. | 370/62 |
| 4,797,877 | 1/1989 | Pope et al. | 370/62 |
| 4,805,205 | 2/1989 | Faye | 370/205 |
| 4,878,242 | 10/1989 | Springer et al. | 379/204 |

FOREIGN PATENT DOCUMENTS 61-32683 2/1986 Japan .
63-86992 4/1988 Japan .
63-246960 10/1988 Japan .
64-54987 3/1989 Japan .

Primary Examiner—Douglas W. Olms
Assistant Examiner—Una Kim
Attorney, Agent, or Firm—Staas & Halsey

[57]   ABSTRACT

A multi-point conference system for making a video conference includes a center unit having a controller and an image selector, and three or more stations respectively coupled to the center unit, where each station includes at least one camera for picking up an image to output an image data, a display for displaying an image based on an image data and a request part for making a request. The controller initially sets master, sub and participating stations in conformance with a predetermined rule. The image selector automatically supplies the image data from the master station to the sub and participating stations to be displayed on the display thereof and supplies the image data from the sub station to the master station to be displayed on the display thereof. The controller automatically sets a new master station in response to a request from the request part of an arbitrary station requesting the new master station, sets the master station prior to receiving the request as a new sub station and sets all stations other than the new master and sub stations as new participating stations.

26 Claims, 13 Drawing Sheets

FIG. 6

| | STATION 1A | STATION 1B | STATION 1D | STATION 1C |
|---|---|---|---|---|
| ① INITIAL STATE (EXAMPLE) | B·ALL MAIN | A·ALL SUB | A·ALL PART | A·ALL PART |
| ② SELECT PERSON FROM 1B (CAMERA CONTROL BY SUB STATION) | B·ALL MAIN | A·P SUB | A·P PART | A·P PART |
| ③ SELECT PERSON FROM 1A (CAMERA CONTROL BY MASTER STATION) | B·P MAIN | A·P SUB | A·P PART | A·P PART |
| ④ SELECT PANORAMIC FROM 1C (CAMERA CONTROL BY PARTICIPATING STATION) | B·P MAIN | A·ALL SUB | A·ALL PART | A·ALL PART |
| ⑤ SELECT PERSON WITHIN 1A | B·P MAIN | A·P SUB | A·P PART | A·P PART |
| ⑥ SELECT PANORAMIC WITHIN 1B | B·ALL MAIN | A·P SUB | A·P PART | A·P PART |
| ⑦ SELECT PERSON WITHIN 1C → NO CHANGE | B·P MAIN | A·P SUB | A·P PART | A·P PART |
| ⑧ SELECT MATERIAL WITHIN 1C → MASTER & SUB INTERCHANGED | C·M SUB | C·M PART | A·P MAIN | C·M PART |
| ⑨ SELECT MATERIAL WITHIN 1A | C·M MAIN | A·M PART | A·M SUB | A·M PART |

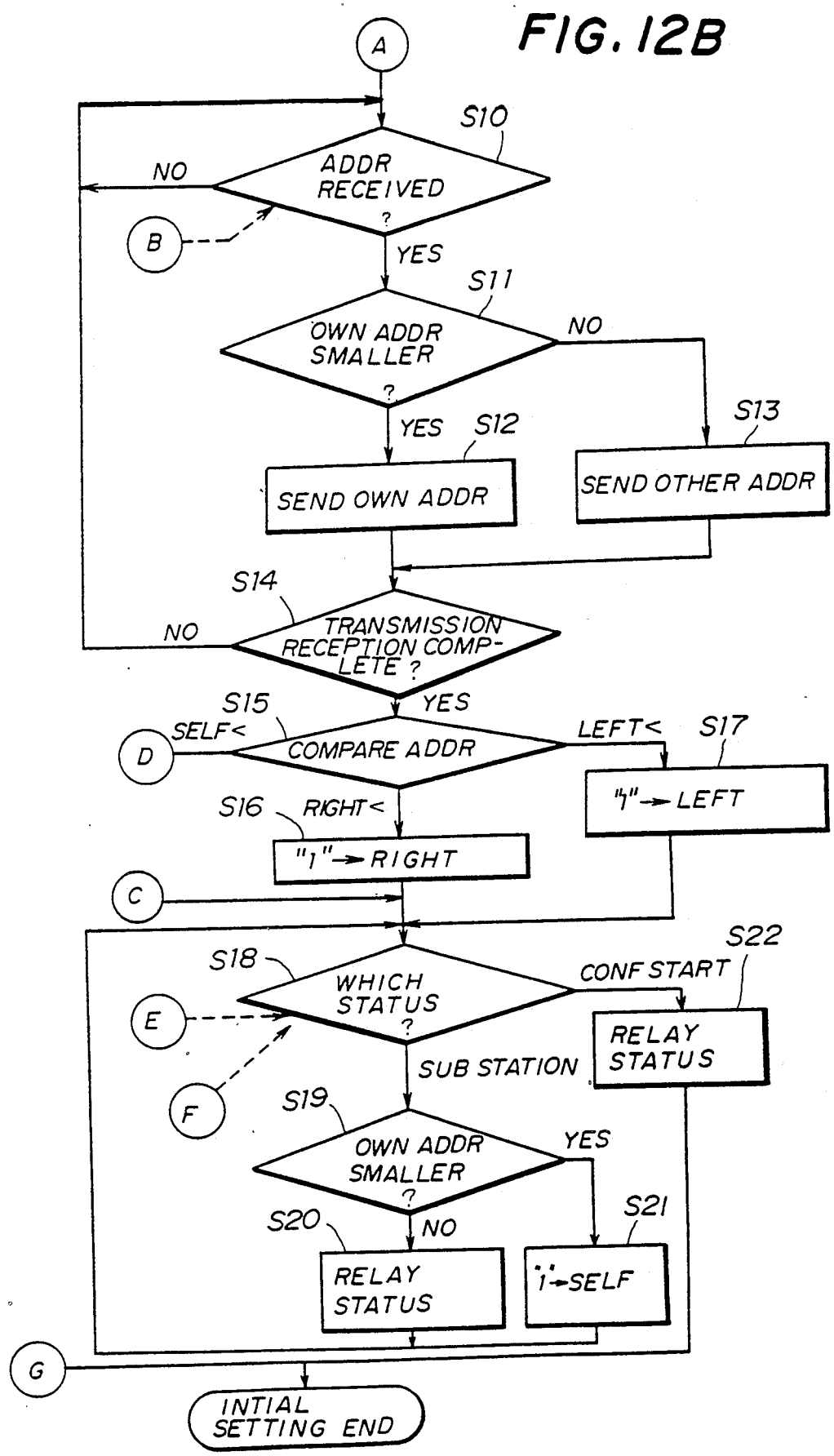

MULTI-POINT CONFERENCE SYSTEM

BACKGROUND OF THE INVENTION

The present invention generally relates to multi-point conference systems, and more particularly to a multi-point conference system which enables a video conference to be made simultaneously among three or more stations.

A video conference is made among distant locations in order to quickly transmit information and to reduce both time and cost of business trips and of moving objects. Presently, a conference (communication) is made between two stations on a point-to-point basis as shown in FIG.1. Each station, that is, each conference room, includes a panoramic camera 11 for picking up a panoramic view of the conference room, a close-up camera 12 for picking up a person (for example, a speaker), a camera 13 for picking up a material used in the conference, a monitor 14 for displaying a received image, a monitor 15 for displaying a transmitting image, a microphone 16, a speaker 17 and a console 18 which are all connected to a conference control unit 20.

The conference control unit 20 controls the input/output of input image data from the cameras 11 through 13 and output image data to the monitors 14 and 15. The conference control unit 20 also controls the coding/decoding of the image data and the audio data, and controls the multiplexing/demultiplexing of the image and audio data. The control operation of the conference control unit 20 realizes an interactive conference between two stations. However, there are demands to realize a multi-point conference system which enables a conference among three or more stations.

As a multi-point conference system which enables a conference among three or more stations, there is a conventional system shown in FIG.2 in which a circuit is connected to all of stations 10. However, as the number of stations 10 increases, the number of circuits also increases. When the number of stations 10 is denoted by n, the number of circuits becomes $\Sigma i$, where $i = 1, 2, \ldots, n-1$. As a result, each station 10 must have the conference control unit 20 shown in FIG.1 with a number of coder/decoder parts corresponding to the number of stations 10 connected thereto.

On the other hand, it is conceivable to connect the circuits in a star connection by use of a center unit 30 as shown in FIG.3. In this case, the center unit 30 selectively distributes the image data to the stations 10. But in this case, the center unit 30 must switch the image data depending on control signals which are received from each of the stations 10. As a result, there is a problem in that the required image data must be manually requested from each of the stations 10, and it is difficult to smoothly and efficiently make the video conference.

SUMMARY OF THE INVENTION

Accordingly, it is a general object of the present invention to provide a novel and useful multi-point conference system in which the problems described above are eliminated.

Another and more specific object of the present invention is to provide a multi-point conference system for making a video conference comprising a center unit including control means and image selector means, and three or more stations respectively coupled to the center unit, where each station includes at least one camera for picking up an image to output an image data, display means for displaying an image based on an image data and request means for making a request. The control means initially sets master, sub and participating stations in conformance with a predetermined rule. The image selector means automatically supplies the image data from the master station to the sub and participating stations to be displayed on the display means thereof and supplies the image data from the sub station to the master station to be displayed on the display means thereof. The control means automatically sets a new master station in response to a request from the request means of an arbitrary station requesting the new master station, sets the master station prior to receiving the request as a new sub station and sets all stations other than the new master and sub stations as new participating stations. According to the multi-point conference system of the present invention, it is possible to smoothly make a video conference among three or more stations.

Still another object of the present invention is to provide a multi-point conference system for making a video conference comprising a plurality of center units, where each center unit includes control means and image selector means, a plurality of stations respectively coupled to each of the center units, where each station includes at least one camera for picking up an image to output an image data, display means for displaying an image based on an image data and request means for making a request, and circuits which couple the center units in a tandem connection. The control means initially sets master, sub and participating stations in conformance with a predetermined rule. The image selector means automatically supplies the image data from the master station to the sub and participating stations to be displayed on the display means thereof and supplies the image data from the sub station to the master station to be displayed on the display means thereof. The control means automatically sets a new master station in response to a first request from the request means of an arbitrary station requesting the new master station, sets the master station prior to receiving the first request as a new sub station and sets all stations other than the new master and sub stations as new participating stations. According to the multi-point conference system of the present invention, it is possible to improve the degree of freedom with which the scale of the conference system can be expanded. In addition, it is possible to suppress the cost of circuits even when the video conference is to be made among distant stations.

Other objects and further features of the present invention will be apparent from the following detailed description when read in conjunction with the accompanying drawings.

BRIEF DESCRIPTION OF THE DRAWINGS

FIG.6 is a diagram for explaining a switching including camera control during the multi-point conference;

FIGS. 12A and 12B are flow chart for explaining an initial setting operation of a controller of the second embodiment.

DESCRIPTION OF THE PREFERRED EMBODIMENTS

First, a description will be given of a first embodiment of a multi-point conference system according to the present invention, by referring to FIG.4. In this embodiment, it is assumed for the sake of convenience that a video conference is to be made among four conference rooms, that is, four stations 1A through 1D.

Figure 4:
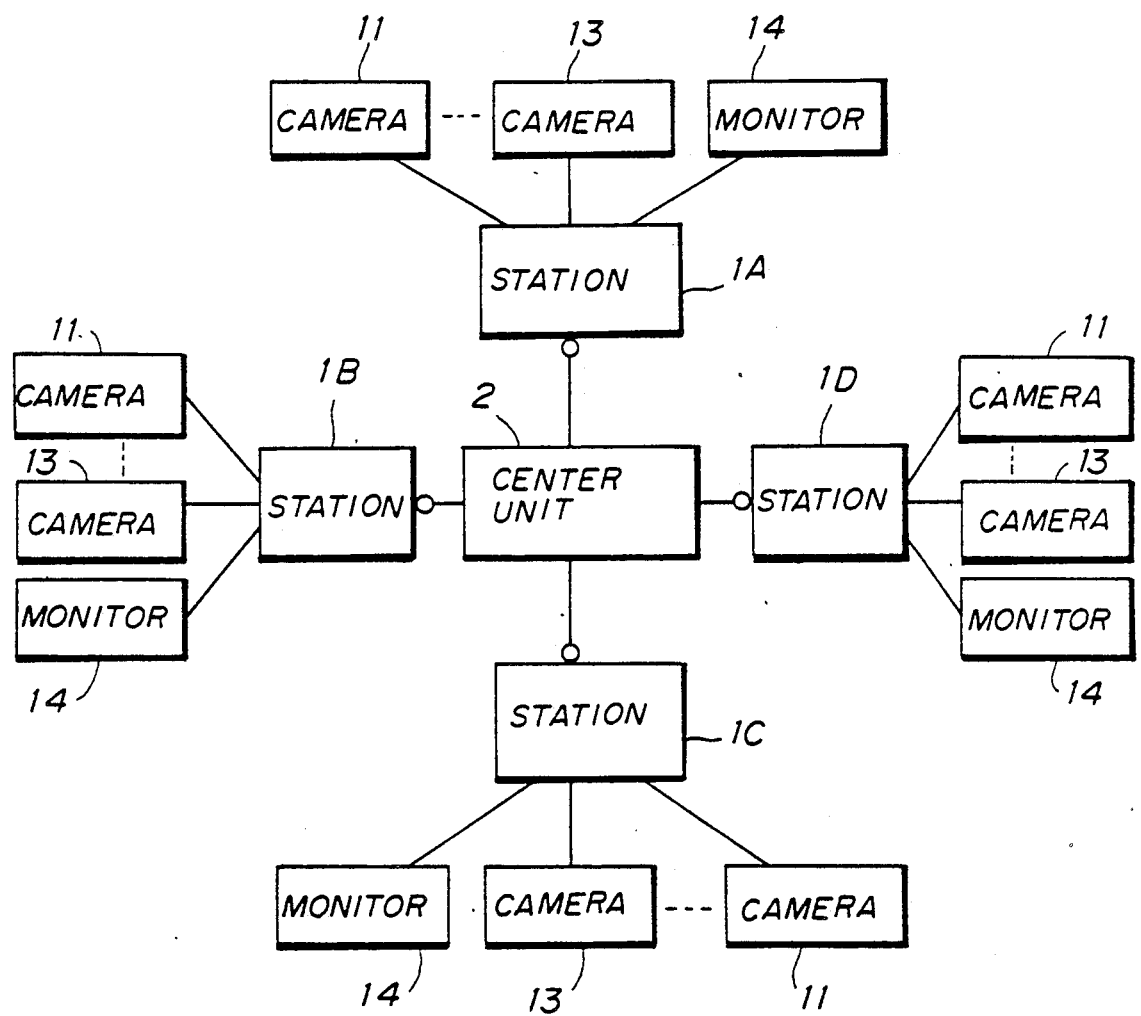
FIG.4 is a system block diagram showing a first embodiment of a multi-point conference system according to the present invention.

In FIG.4, the four stations 1A through 1D are coupled to a center unit 2. Each of the stations 1A through 1D respectively have cameras 11 through 13, a monitor 14 and the like similarly to the conference control unit 20 shown in FIG.1. Only the cameras 11 and 13 and the monitor 14 are shown to simplify the drawing. In this embodiment, one of the names "master station", "sub station" and "participating station" is automatically assigned to each of the stations 1A through 1D depending on the course of the video conference, and each of the stations 1A through 1D automatically switch and display an image from one of the three other stations.

Figure 5:
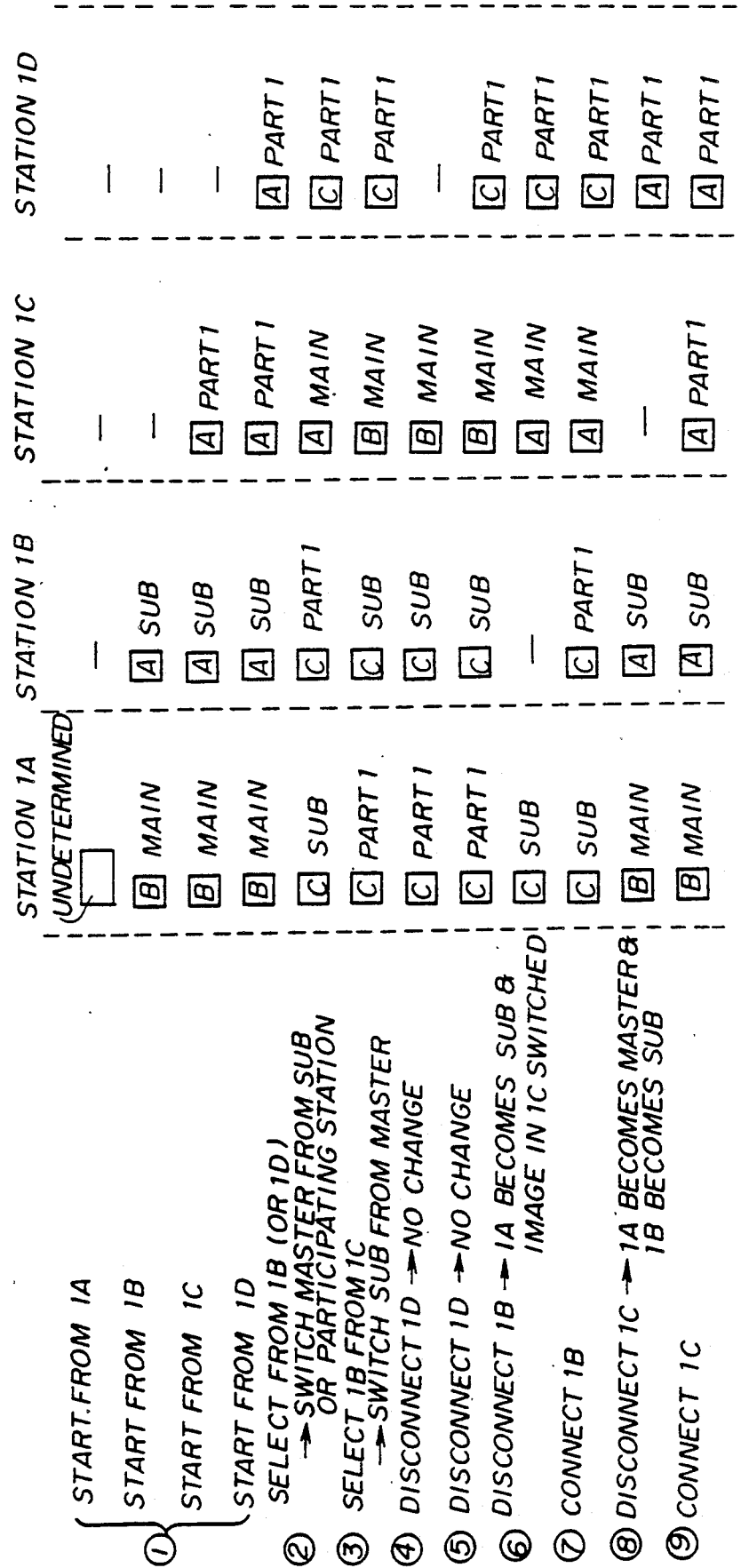
FIG.5 is a diagram for explaining a switching of image data during a multi-point conference.

A description will now be given of the switching transition of the image displayed on each monitor 14 of the stations 1A through 1D, by referring to FIG.5. In FIG.5 and FIG.6 which will be described later, a rectangular symbol indicates the station from which the displayed image is received, "A" through "D" respectively denote the stations 1A through 1D, and "PARTI" indicates "participating" station.

At the start of the video conference, the station 1A which assumes the conference state first is regarded as a master station. A station assumes the conference state when the units making up the station are turned ON, the necessary circuit connection is made and the like. The station 1B which assumes the conference state second is regarded as a sub station. The stations 1C and 1D which assume the conference state thereafter are regarded as participating stations. As shown in FIG.5(1), the master station displays the image data from the sub station on the monitor 14 while the sub and participating stations display the image data from the master station on the respective monitors 14. In other words, only the image data from two stations are displayed at one time during the video conference as a whole.

After the start of the video conference, when control data which newly selects the station 1C is received from the sub or participating station (for example, 1B or 1D), the center unit 2 assumes that the newly selected station 1C has become the center of the video conference and regards the station 1C as a master station. The station from which the image data displayed on the monitor 14 of the station 1C is obtained before the center unit 2 receives the control data, that is, the station 1A, is then regarded as a sub station and the stations 1B and 1D which are other than the master and sub stations are regarded as participating stations. Similarly as described above, the image data from the master station 1C is displayed on the respective monitors 14 of the sub and participating stations 1A, 1B and 1D while the image data from the sub station 1A is displayed on the monitor 14 of the master station 1C as shown in FIG.5(2). When control data which newly selects the station 1B is received from the master station 1C, the center unit 2 regards the newly selected station 1B as a sub station and the monitor 14 of the master station 1C is switched to thereafter display the image data from the sub station 1B, while the center unit 2 regards the station 1A as a participating station as shown in FIG.5(3). The master and participating stations 1C and 1D remain unchanged in this case.

When the participating station 1D no longer needs to participate in the video conference and disconnects, there is no change in the assignment of the master, sub and participating stations as shown in FIG.5(4). On the other hand, when the station 1D needs to participate during the video conference and connects, the center unit 2 merely regards the newly connected station 1D as a participating station, and the assignment of the master, sub and participating stations remains unchanged as shown in FIG.5(5).

When the sub station 1B no longer needs to participate in the video conference and disconnects, the center unit 2 forcibly sets an arbitrary participating station 1A as a sub station as shown in FIG.5(6). On the other hand, when the station 1B needs to participate during the video conference and connects, the center unit 2 merely regards the newly connected station 1B as a participating station, and the assignment of the master, sub and participating stations remains unchanged as shown in FIG.5(7).

When the master station 1C no longer needs to participate in the video conference and disconnects, the center unit 2 forcibly sets the sub station 1A as a master station and forcibly sets an arbitrary participating station 1B as a sub station as shown in FIG.5(8). On the other hand, when the station 1C needs to participate during the video conference and connects, the center unit 2 merely regards the newly connected station 1C as a participating station, and the assignment of the master, sub and participating stations remains unchanged as shown in FIG.5(9).

Of course, it is possible to take measures so that an arbitrary station designated from the master station becomes a new master station. In this case, the old master station becomes a new sub station, and the old sub station becomes a new participating station.

Next, a description will be given of the camera control, by referring to FIG.6. The camera control includes moving the cameras 11 through 13 and switching the cameras 11 through 13 to pickup the person, the panoramic view or the material. In FIG.6, "ALL" indicates the panoramic view, "P" indicates the person, and "M" indicates the material which are displayed.

The camera control may be divided into two kinds of control. According to one kind of camera control, the station controls the cameras 11, 12 and 13 thereof. According to another kind of camera control, one station controls the cameras 11 through 13 of another station from which the displayed image data on the monitor 14 is received. In other words, the master station may control the cameras of the sub station, and the sub or participating station may control the cameras of the master station.

With regard to the control of the cameras of the master station, the priority of the control is given to the sub or participating station which requests the control first. FIG.6(1) shows an initial state of the camera control. When the sub station 1B requests the display of the person, the monitors 14 of the sub and participating stations 1B, 1C and 1D all display the person picked up by the camera 12 of the master station 1A as shown in FIG.6(2). In this state, the monitor 14 of the master station 1A displays the panoramic view picked up by the camera 11 of the sub station 1B. When the master station 1A requests the display of the person, the monitor 14 of the master station 1A displays the person which is picked up on the camera 12 of the sub station 1B while the monitors 14 of the sub and participating stations 1B, 1C and 1D all remain unchanged and display the person picked up by the camera 12 of the master station 1A as shown in FIG.6(3). When the participating station 1C requests the display of the panoramic view, the monitor 14 of the master station 1A remains unchanged and displays the person which is picked up on the camera 12 of the sub station 1B while the monitors 14 of the sub and participating stations 1B, 1C and 1D all change and display the panoramic view picked up by the camera 11 of the master station 1A as shown in FIG.6(4).

When the station controls the cameras thereof, the camera control becomes as shown in FIGS.6(5) through 6(7). In other words, when the master station 1A controls the camera 12 thereof to pickup a certain person, the image data displayed on the monitor 14 of the master station 1A remains unchanged but the image data displayed on the sub and participating stations 1B through 1D changes as shown in FIG.6(5). When the sub station 1B controls the camera 12 thereof to pickup a certain person, the image data displayed on the monitor 14 of the master station 1A changes but the image data displayed on the sub and participating stations 1B through 1D remains unchanged as shown in FIG.6(6). On the other hand, when the participating station 1C or 1D controls the camera 12 thereof to pickup a certain person, the image data displayed on the monitors 14 of the master, sub and participating stations 1A through 1D all remain unchanged as shown in FIG.6(7).

When using the camera 13 to pickup the material, the operator must perform an operation of preparing, selecting and setting the material. For this reason, each station controls the camera 13 thereof. Normally, when selecting the material which is to be picked up by the camera 13, the video conference is usually to progress by use of the material, that is, while watching the material. Hence, when the camera 13 is selected at an arbitrary station to pick up the material, the center unit 2 regards this arbitrary station as the master station as shown in FIGS.6(8) and 6(9). In the case shown in FIG.6(8), when the participating station 1C selects the camera 13 to pick up the material, the center unit 2 regards the station 1C as the new master station and regards the station 1A which was the master station before the selection of the camera 13 in the station 1C as the new sub station. In addition, the center unit 2 regards the station 1B which was the sub station before the selection of the camera 13 in the station 1C as the new participating station, while the participating station 1D remains unchanged. On the other hand, in the case shown in FIG.6(9), when the sub station 1A selects the camera 13 to pick up the material, and the center unit 2 regards the station 1A as the new master station and regards the station 1C which was the master station before the selection of the camera 13 in the station 1A as the new sub station. In addition, the participating stations 1B and 1D remain unchanged.

Therefore, the switching of the image data is automatically controlled by the center unit 2 depending on the control data received from the stations 1A through 1D. As a result, the video conference can be made smoothly and efficiently, and the course of the video conference can be unified.

Figure 7:
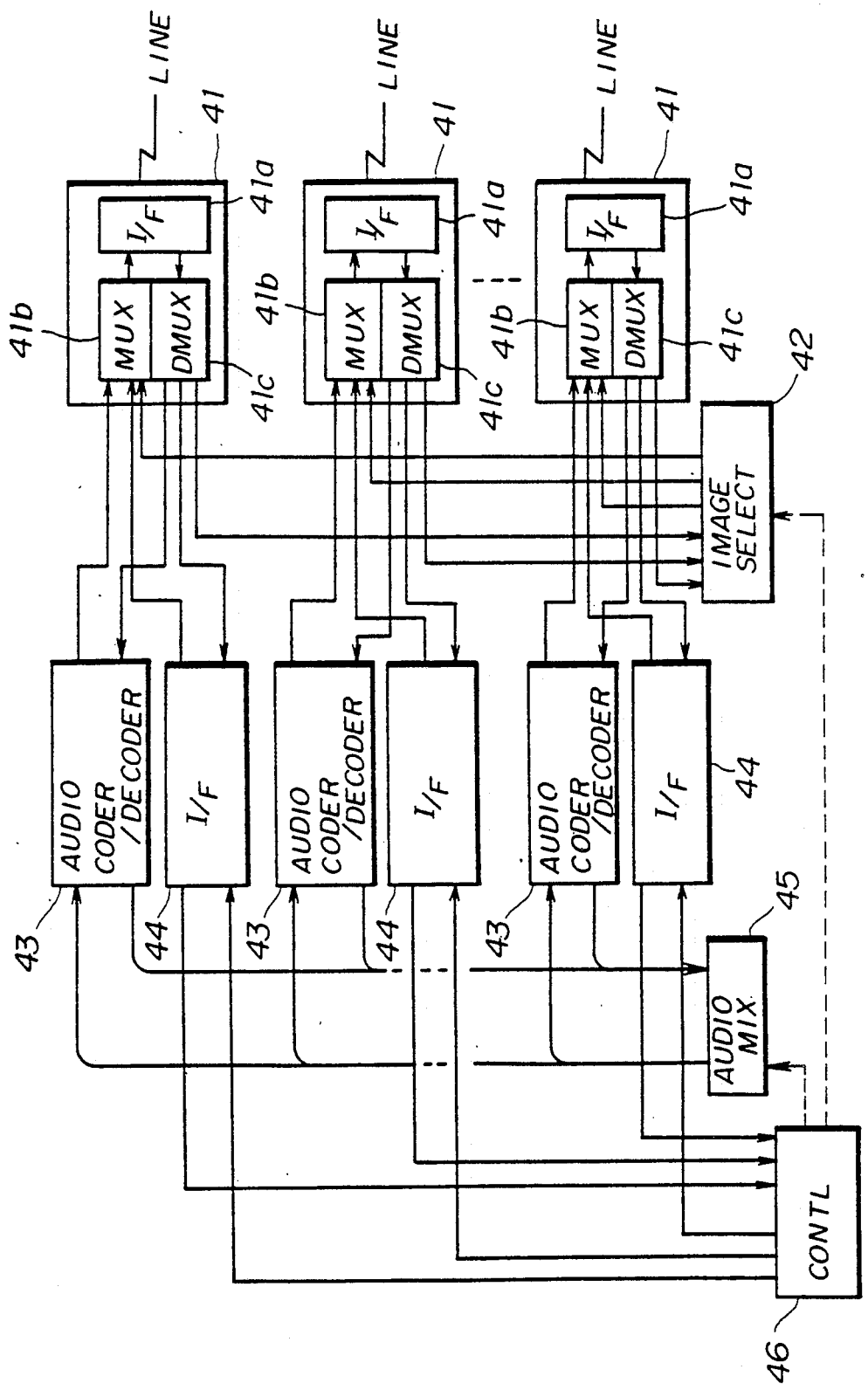
FIG.7 is a system block diagram showing an embodiment of a center unit shown in FIG.4.

Next, a description will be given of an embodiment of the center unit 2 shown in FIG.4, by referring to FIG.7. The center unit 2 includes line control units 41, an image selector 42, audio coder/decoder parts 43, interfaces 44, an audio mixer 45 and a controller 46.

The number of line control units 41 is equal to the number of stations to which the center unit 2 is connected. In this embodiment, there are three line control units 41. The line control unit 41 is made up of a circuit interface 41a, a multiplexer 41b and a demultiplexer 41c which are connected as shown. The image selector 42 selectively supplies an image signal from the demultiplexer 41c of one line control unit 41 to the multiplexer 41b of another line control unit 41.

The audio coder/decoder part 43 is provided with respect to each line control unit 41. The audio coder/decoder part 43 decodes audio data from the demultiplexer 41c of the corresponding line control unit 41 and also codes audio data which is supplied to the multiplexer 41b of the corresponding line control unit 41.

The interface 44 is also provided with respect to each line control unit 41. The interface 44 receives low-speed control data from the demultiplexer 41c of the corresponding line control unit 41 and also supplies control data to the multiplexer 41b of the corresponding line control unit 41.

The audio mixer 45 mixes the audio data received from each of the stations via each of the audio coder/decoder parts 43 and supplies a common mixed audio data to each of the audio coder decoder parts 43.

The controller 46 controls the selection of the image selector 42 and also control the audio mixer 45 based on the control data from the interfaces 44. The controller 46 also supplies control data to each of the stations via the interfaces 44. In other words, the controller 46 prestores a software for carrying out the control algorithms described in conjunction with FIGS.5 and 6.

Figure 1:
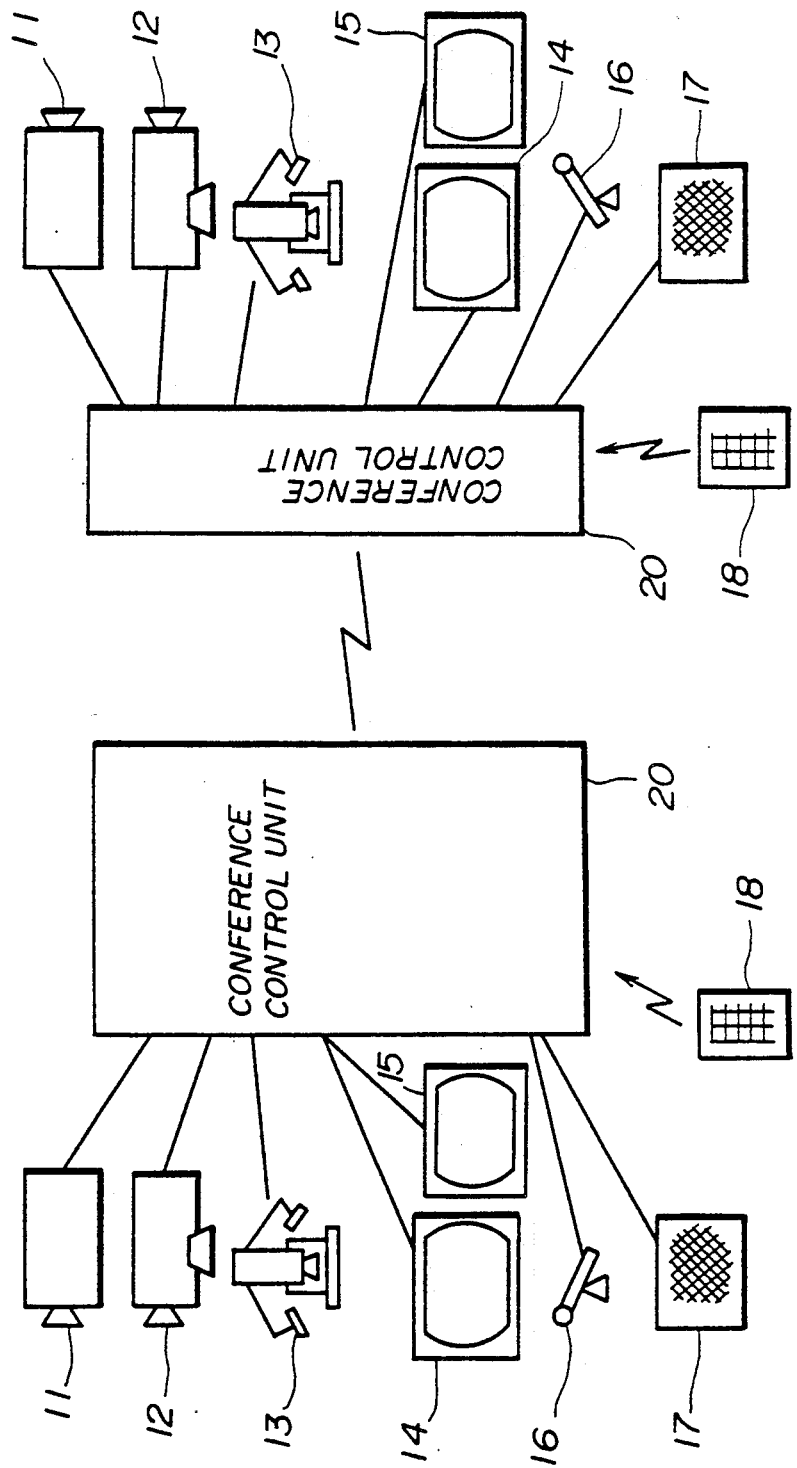
FIG.1 is a system block diagram showing a conventional conference system which enables a video conference between two stations.
Figure 2:
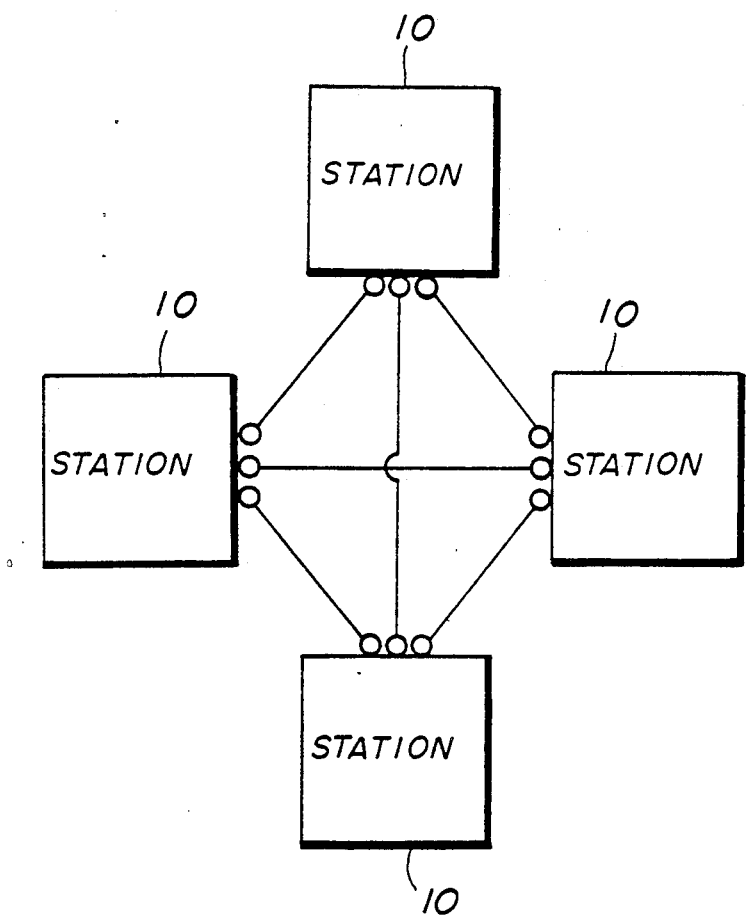
FIG.2 is a system block diagram showing a conventional multi-point conference system which enables a video conference among three or more stations.
Figure 3:
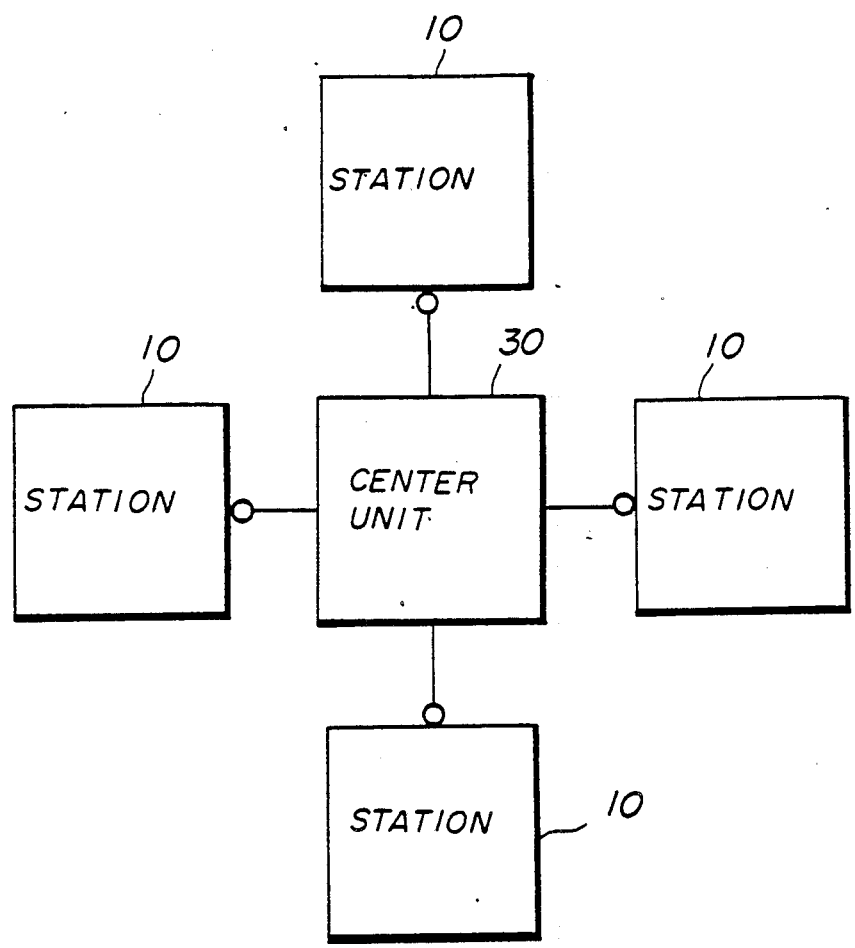
FIG.3 is a system block diagram showing a conceivable multi-point conference system which enables a video conference among three or more stations.

For the sake of convenience, it is assumed that each station has the structure including the conference control unit 20 and the elements connected thereto as shown in FIG.1. In FIG.7, each line control unit 41 receives input/output image control data which is received from the console 18 via the conference control unit 20 of the corresponding station. The demultiplexer 41c of the line control unit 41 demultiplexes the input/output image control data and supplies the data to the controller 46 via the interface 44. The controller 46 discriminates which image data from the stations is to be displayed on the monitors 14 of the stations and which cameras are to be used in the stations based on the control algorithms described above. The controller 46 controls the image selector 42 depending on the above discrimination, so that the image data from a station is supplied to and displayed on the monitor 14 of another station. In addition, the controller 46 supplies the control data for selecting the camera and the monitor to each station via the interface 44. Under the control of the controller 46, the audio mixer 45 mixes the audio data from the microphones 16 of each of the stations and supplies the mixed audio data to the speakers 17 of each of the stations, so that at one station the speaker 17 outputs the voices from each of the stations except the voice picked up within the same station.

The center unit 2 automatically controls the switching of the image data based on the control data from each of the stations. For this reason, the multi-point video conference can be carried out substantially as if the video conference were made at one location and the course of the video conference is extremely smooth because the image data to and from each station are switched automatically.

A method of automatically detecting the speaker during the video conference and controlling the camera depending on the detection is proposed in Japanese Laid-Open Patent Applications No.2-52581 and No.2-5282. According to this proposed method, the audio data from the microphones in each of the stations are supervised and the speaker is detected when the audio data from the microphone of one station continues for a predetermined time. When the speaker is detected, the camera is moved to pick up the speaker who is speaking to the microphone in the station.

The above proposed method is also applicable to the first embodiment. That is, the center unit 2 can switch the image data from the stations depending on the speaker detection data from one of the stations, and regards one station as the master station when the speaker detection data is received from this one station. Therefore, the speaker detection data may be treated similarly to the control data when automatically switching the image data, and the course of the video conference becomes even smoother.

When the control data supplied to the center unit 2 includes the speaker detection data, it is desirable to treat the control data manually input from the console 18 of the station with a priority over the speaker detection data. For example, the manual control data from one station may indicate that this station is to be regarded as the master station. Furthermore, the manual control data from the master station may indicate which station is to be regarded as the sub station. In such cases, the center unit 2 controls the switching of the image data based on the manual control data by disregarding the speaker detection data.

In addition, the image data displayed on the monitor 14 of one station is not limited to the image from one camera within another station. For example, the monitor 14 of one station may simultaneously display the images picked up by the cameras 12 and 13 of another station. When the master station 1A selects the camera 13 and the image data from the camera 12 of the sub station 1C is received in a case shown in FIG.6(9), the monitor 14 of the master station 1A simultaneously displays the images from the cameras 12 and 13 of the sub station 1C.

When the image data from the camera 12 of the master station 1C is displayed on the monitor 14 of the sub station 1A in a case shown in FIG.6(8), it is also possible to switch the display within the master station 1C so that the monitor 14 of the master station 1C displays the image data from the camera 13 thereof.

According to this embodiment, the center unit assigns the names "master station", "sub station" and participating station" to each of the stations, and automatically controls the switching of the image data to and from each of the stations based on the control data which are received from the stations. The switching of the image data is made by selecting the appropriate cameras. Therefore, the video conference can be made smoothly and efficiently, and the course of the video conference can be unified similarly as in the case of a video conference between two stations.

Figure 8:
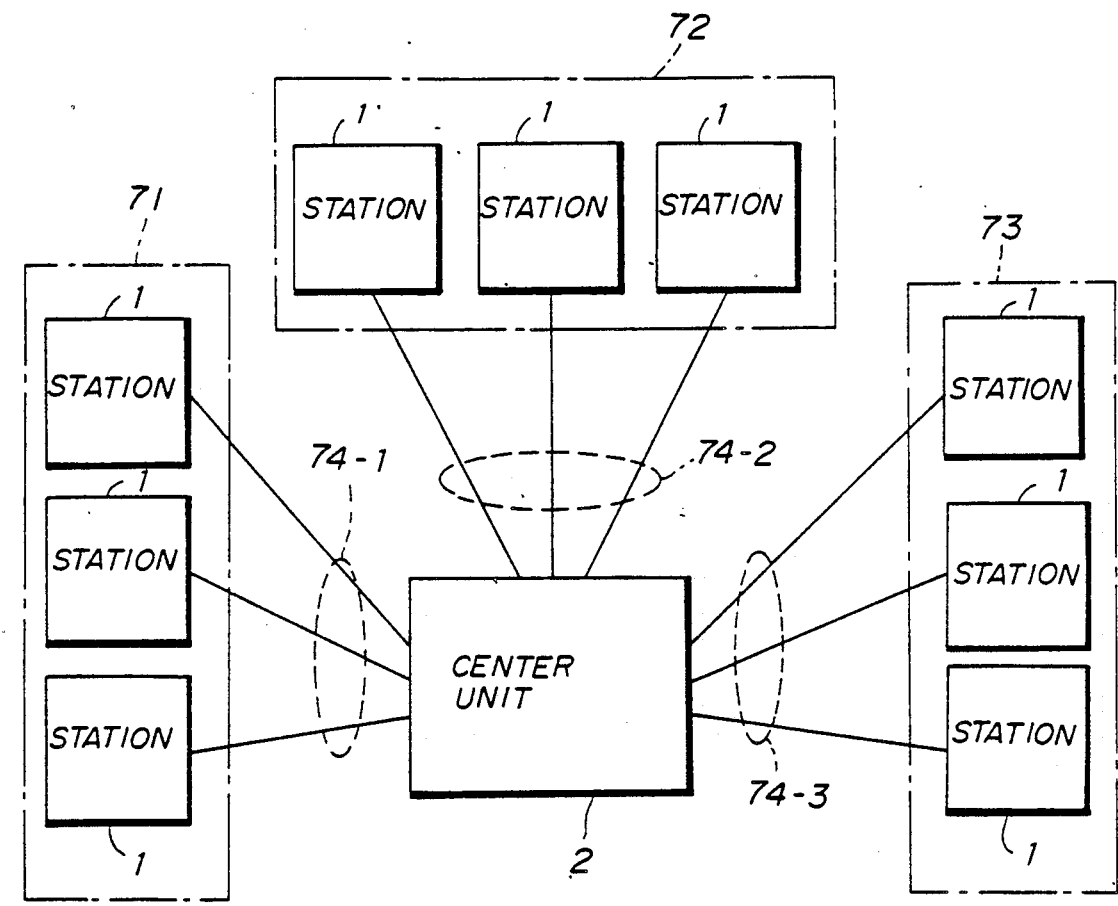
FIG.8 is a system block diagram for explaining a video conference made among three distant regions.

On the other hand, when the video conference is to take place among three mutually distant regions 71 through 73 as shown in FIG.8, for example, each station 1 within one of the regions 71 through 73 must be coupled to the center unit 2 via a corresponding one of circuits 74-1 through 74-3. The center unit 2 assigns the master, sub and participating stations depending on the control data from each of the stations 1 which are involved in the video conference.

However, as the number of stations which are to participate in the video conference increases and the stations are provided within a plurality of regions, a large number of circuits is required to couple each station to the center unit, and each circuit which couples one station to the center unit is long when the regions are distant from each other. For this reason, there is a problem in that the cost of the required circuits becomes high when enabling the video conference among three or more stations located within mutually distant regions.

Furthermore, the scale of the center unit becomes extremely large as the number of stations connectable thereto increases. On the other hand, when a maximum number of connectable stations are coupled to the center unit, there is a problem in that an additional station cannot be newly coupled to the center unit and the multi-point conference system has no freedom of system expansion.

Figure 9:
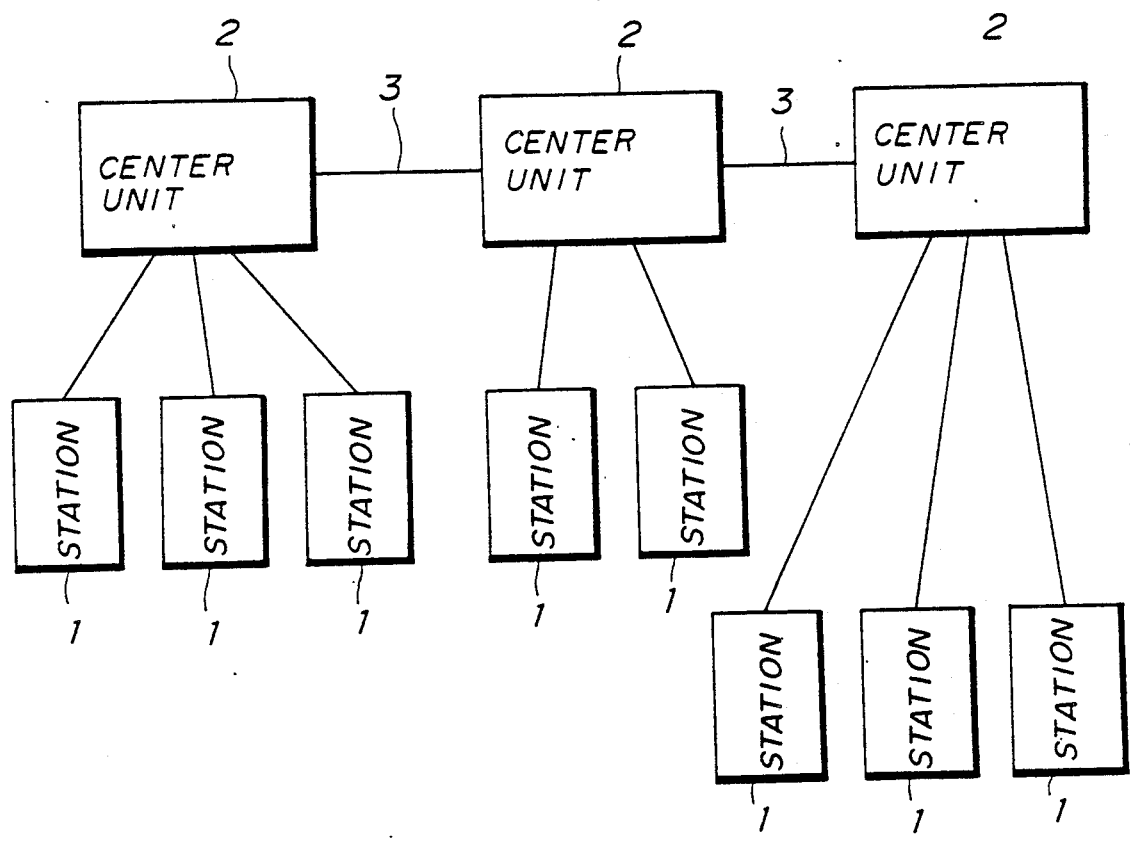
FIG.9 is a system block diagram showing a second embodiment of the multi-point conference system according to the present invention.

Accordingly, a description will now be given of a second embodiment of the multi-point conference system according to the present invention in which the above noted problems are overcome. FIG.9 shows the second embodiment.

In FIG.9, a plurality of stations 1 are connected to each center unit 2, and a plurality of such center units 2 are coupled via circuits 3. Each center unit 2 assigns the names "master station", "sub station" and "participating station" to each of the stations 1 connected thereto similarly to the first embodiment. And in this second embodiment, the center units 2 are coupled in tandem via the circuits 3, so that an arbitrary number of stations 1 may participate in a video conference.

The center unit 2 which is connected to the master station 1 is regarded as a master center unit, and the center unit 2 which is connected to the sub station 1 is regarded as a sub center unit. The master center unit 2 supplies the image data from the master station 1 to the center units 2 which are connected to the stations 1 other than the master station 1. On the other hand, the sub center unit 2 supplies the image data from the sub station 1 to the master center unit 2.

Initially when the center units 2 are connected in tandem using the circuits 3, addresses assigned to the center units 2 are transmitted and received among the center units 2. The center unit 2 having a minimum address is regarded as a master center unit which is connected to the master station, and the center unit 2 having a minimum address excluding the address of the master center unit is regarded as a sub center unit which is connected to the sub station.

Each center unit 2 is connected to an arbitrary number of stations 1. Hence, by connecting the center units 2 in tandem using the circuits 3, the number of stations 1 which can participate in the video conference can be increased arbitrarily in correspondence with the number of center units 2 which are coupled via the circuits 3. In other words, the degree of freedom with which the multi-point conference system can be expanded is greatly improved in this embodiment. In addition, since only one circuit 3 is required to coupled two center units 2, it is possible to suppress the increase in expansion cost even when the distance between the two center units 2 is long.

In addition, when assigning the master, sub and participating stations at the start of the video conference, an initial setting is made and the transmission and reception of the image data among the center units 2 are controlled in each center unit 2. The initial setting includes comparing the addresses which are assigned to each of the center units 2 beforehand. By this initial setting, the center unit 2 having a minimum address is regarded as a master center unit which is connected to the master station, the center unit 2 having a minimum address excluding the address of the master center unit is regarded as a sub center unit which is connected to the sub station, and each of the other center units 2 are regarded as a participating center unit which is connected only to the participating station.

Figure 10:
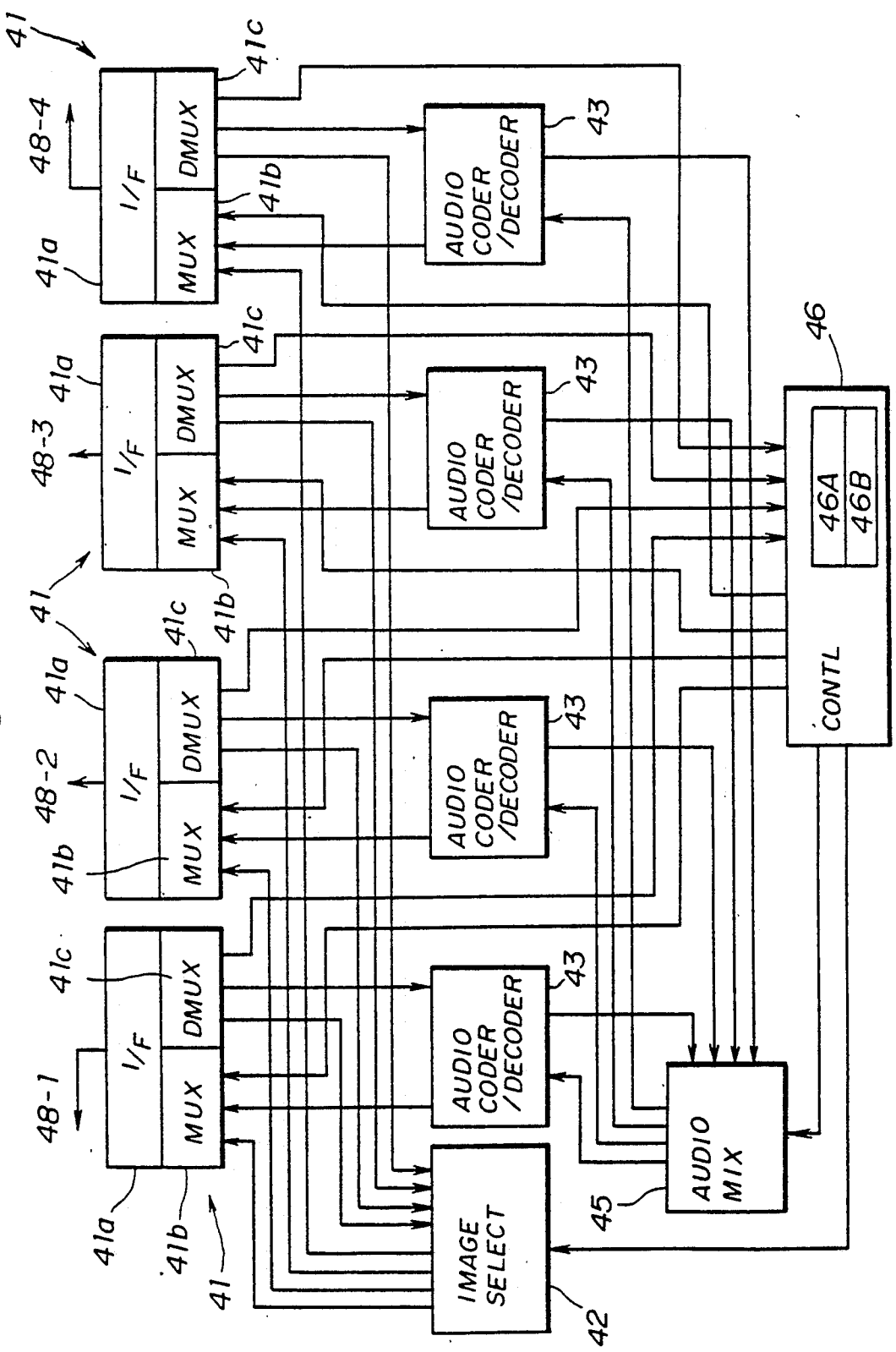
FIG.10 is a system block diagram showing an embodiment of the center unit shown in FIG.9.

FIG.10 shows an embodiment of the center unit 2 shown in FIG.9. In FIG.10, those parts which are essentially the same as those corresponding parts in FIG.7 are designated by the same reference numerals, and a description thereof will be omitted. The circuit interface 41a of each line control unit 41 is connected to a corresponding one of circuits 48-1 through 48-4.

The circuits 48-1 and 48-4 couple the center unit 2 shown in FIG.10 in tandem to other center units 2 which are not shown in FIG.10. On the other hand, the circuits 48-2 and 48-3 connect the center unit 2 shown in FIG.10 to the stations 1 which are not shown in FIG.10. In this embodiment, it is assumed for the sake of convenience that two stations 1 can be connected to the center unit 2 shown in FIG.10, but it is of course possible to connect more than two stations 1 to the center unit 2. In addition, the center unit 2 which is located at each end of the tandem connection only requires one of the circuits 48-1 and 48-4.

The image and audio data are processed similarly as in the first embodiment. The master, sub and participating stations are assigned to each of the stations 1 which participate in the video conference. In addition, the assignment of the master, sub and participating stations is appropriately changed depending on the control data from the stations 1. As described above, the center unit 2 which is connected to the master station 1 is regarded as the master center unit.

The controller 46 controls the image selector 42 in each center unit 2 so that the image data from the master station 1 is transmitted to the sub and participating stations 1 and the image data from the sub station 1 is transmitted to the master station 1. Accordingly, the master center unit 2 transmits the image data to other center units 2, and the sub center unit 2 which is connected to the sub station 1 transmits the image data to the master center unit 2.

For example, when the station 1 which is coupled to the center unit 2 via the circuit 48-2 becomes a master station, the image data from the master station 1 is supplied to the multiplexer 41b via the circuit interface 41a. After the image data is separated from the audio and control data, the image data is supplied to the image selector 42 which is controlled by the controller 46 so that the image data is transmitted to the other circuits 48-1, 48-3 and 48-4. The image selector 42 is controlled by the controller 46 so that the image data from the sub station 1 is transmitted to the circuit 48-2.

Therefore, at an arbitrary station 1, it is possible to listen to the audio data from all other stations 1. In addition, the image data from eh sub station 1 is displayed in the master station 1 while the image data from the master station 1 is displayed in the sub and participating stations 1. When the sub or participating station 1 is regarded as a new master station in response to the control data (manual control data, speaker detection data and the like), the old master station 1 is regarded as a new sub station and the other stations 1 are all regarded as participating stations. When the image data from the participating station 1 is requested for the master station 1, this participating station 1 is regarded as a new sub station and the old sub station 1 is regarded as a participating station. Such a control of the assignment of the master, sub and participating stations is carried ut by the controller 46. For example, the control data from the stations 1 are received by the circuit interfaces 41a via the circuits 48-2 and 48-3, and the multiplexers 41b separate and supply the control data to the controller 46. The controller 46 uses flag setting parts 46A and 46B to display that a change is made in the assignment of the master, sub and participating stations. The controller 476 also manages information on which stations 1 are regarded as the master, sub and participating stations. Furthermore, the controller 46 displays whether or not the center unit 2 is a master center unit.

Next, a description will be given of the operation of this embodiment, by referring to FIGS.11(a) through 11(f).

FIG.11(a) shows four center units 21, 22, 23 and 24 which are connected in tandem via circuits 25, 26 and 27. Addresses A3, A1, A4 and A2 are respectively assigned to the center units 21, 22, 23 and 24, where A1 <A2 <A3 <A4. For example, the center unit 21 which is located on one end of the tandem connection and only has one circuit 25 connected thereto sends its own address A3 to the center unit 22 via the circuit 25 to make an initial setting, as indicated on the upper part of FIG.11(b). The center unit 22 compares the received address A3 and its own address A1, and sends the smaller address A1 to the center unit 23 via the circuit 26 because A3 >A1. The center unit 23 compares the received address A1 and its own address A4, and sends the smaller address A1 to the center unit 24 via the circuit 27 since A4 >A1. The center unit 24 compares the received address A1 and its own address A2, and judges that the address A2 thereof is not the minimum address because A2 >A1.

The center unit 24 is located at one end of the tandem connection and sends its own address A2 to the center unit 23 via the circuit 27 as shown on the lower part of FIG.11(b). By making the transmission and reception of the addresses in the above described manner, the center unit 24 judges that it is not a master center unit. This means that the master center unit is coupled on the side of the circuit 27, and the center unit 24 sets a value "1" on the left side of a master station direction flag as shown in FIG.11(c). The center unit 23 compares the address A2 received from the center unit 24 and its own address A4, and sends the smaller address A2 to the center unit 22 via the circuit 26 because A4 > A2. At a time when the addresses are received from the center units 22 and 24 on both sides of the center unit 23, the center unit 23 judges that the master center unit is coupled on the side of the circuit 26 and not the circuit 27. Hence, the center unit 23 sets a value "1" on the left side of the master station direction flag as shown in FIG.11(c).

The center unit 22 compares the address A2 received from the center unit 23 and its own address A1, and judges that its address A1 is the minimum address since A1 < A2. Accordingly, the center unit 22 sets a value "1" at the center of the master station direction flag as shown in FIG.11(c) to indicate that the center unit 22 is the master center unit. On the other hand, the center unit 22 sends its own address A1 to the center unit 21 via the circuit 25. The center unit 21 compares the address A1 and its own address A3, and judges that the master center unit is coupled on the side of the circuit 25 because A3 > A1. Hence, the center unit 21 sets a value "1" on the right side of the master station direction flag as shown in FIG.11(c).

The master center unit 22 compares the addresses A2 and A3 which are respectively received from the right and left thereof, and since A3 > A2, the master center unit 22 judges that a sub center unit which is connected to the sub station 1 exists on the right side of the master center unit 22. Hence, the master center unit 22 sends a sub station designation status on the circuit 26 as shown in FIG.11(d), and sets a value "1" on the right side of a sub station direction flag as shown in FIG.11(e). The center unit 23 compares the address A2 of the sub station designation status and its own address A4, and sends the sub station designation status to the circuit 27 as it is because A4 > A2. The center unit 24 sets a value "1" at the center of the sub station direction flag in response to the sub station designation status and to indicate that the center unit 24 is the sub center unit. The flag setting parts 46A and 46B of the controller 46 are respectively used for storing the master and sub station direction flags.

Next, as shown in FIG.11(f), the master center unit 22 sends a conference start status to the circuits 25 and 26. The center unit 23 relays the conference start status and supplies the conference start status to the center unit 24 via the circuit 27. As a result, an initial setting is made with respect to the master and sub center units 22 and 24 as shown in FIG.11(f). For example, when a station 31 which is connected to the master center unit 22 is regarded as the master station and a station 35 which is connected to the sub center unit 24 is regarded as the sub station, an image signal a from the master station 31 is transmitted to stations 28, 29, 30 and 32 through 37 which are either the sub station or the participating station via the master center unit 22 and the other center units 21, 13 and 24. On the other hand, an image signal b from the sub station 35 is transmitted from the sub center unit 24 to the master center unit 22 via the circuit 27, the center unit 23 and the circuit 26, and the image signal b is transmitted to the master station 31 from the master center unit 22.

Figure 12A:
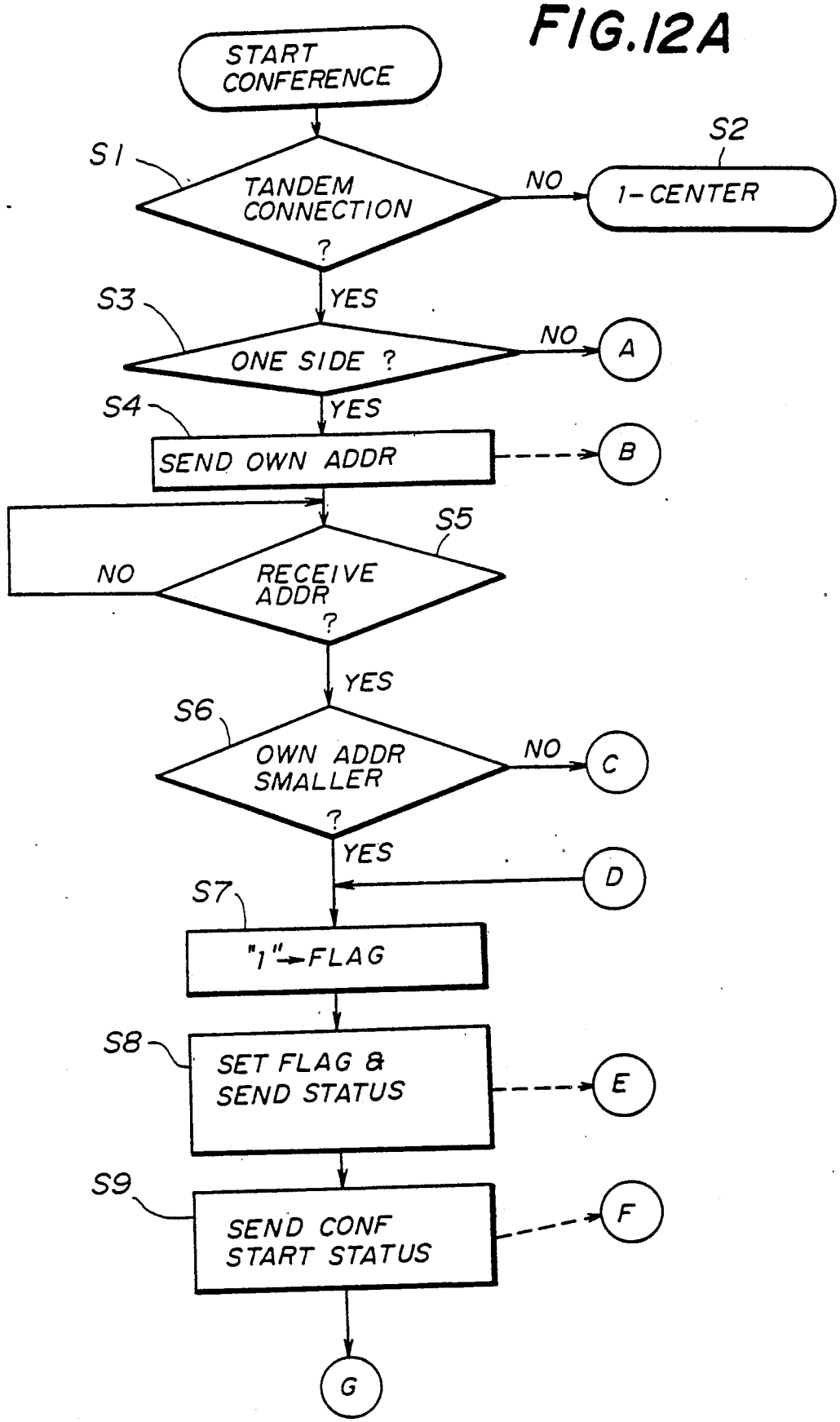

FIG.12 is a flow chart for explaining the initial setting operation of the controller 46 described above. In FIG.12, a step S1 discriminates whether or not a tandem connection is made by the start of the video conference. When the discrimination result in the step S1 is NO, a step S2 makes a 1-center operation in which the video conference is made among stations which are connected to a single center unit.

Figure 11:
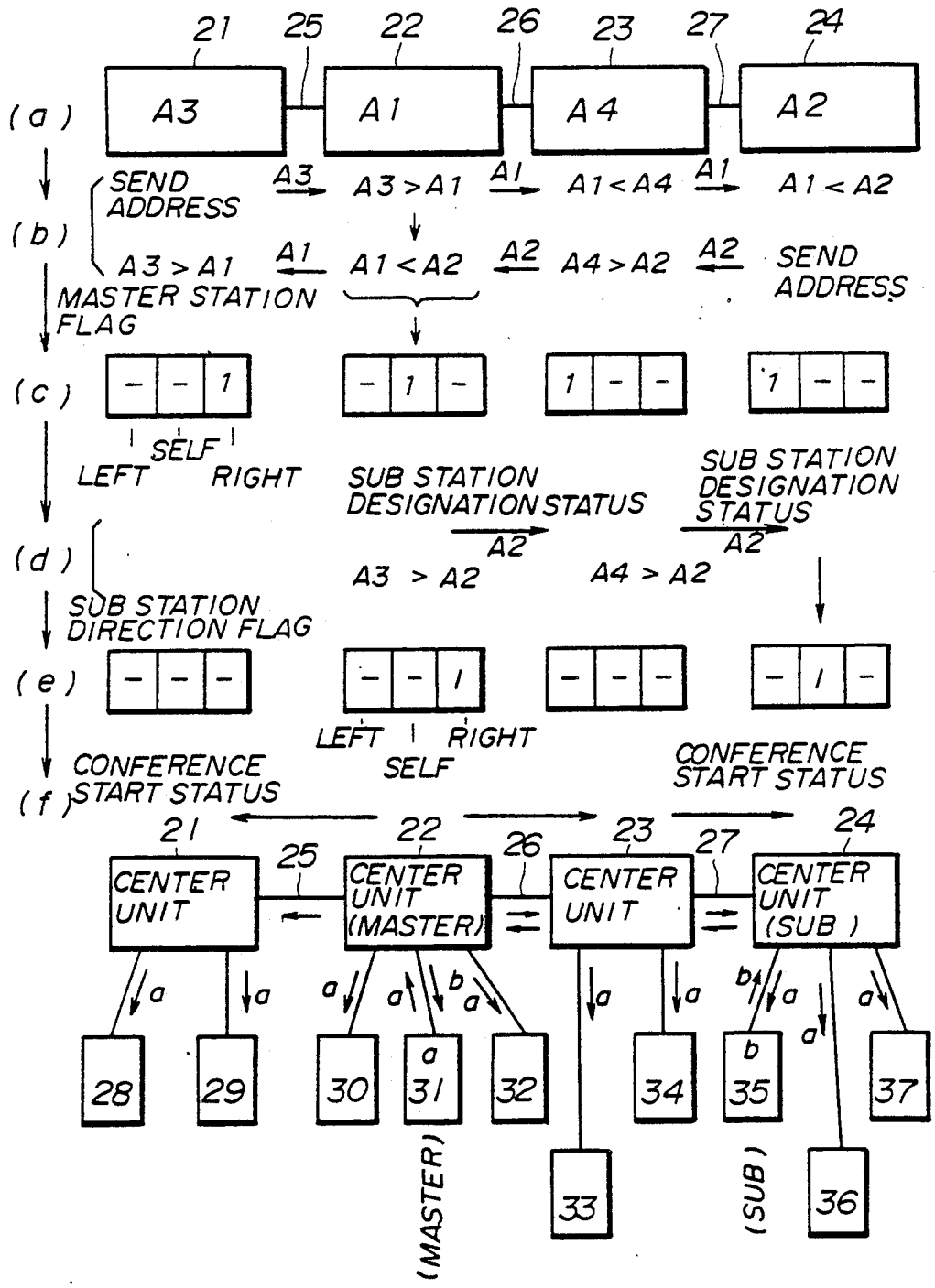
FIG.11 is a diagram for explaining an operation of the second embodiment.

On the other hand, when the discrimination result in the step S1 is YES, a step S3 discriminates whether or not the center unit is located on one end of the tandem connection and has a circuit connected on only one side thereof as in the case of the center units 21 and 24 shown in FIG.11. When the discrimination result in the step S3 is YES, a step S4 sends out its own address and a step S5 discriminates whether or not an address is received from another center unit. When the discrimination result in the step S5 becomes YES, a step S6 discriminates whether or not its own address is smaller than the address received from the other center unit. When the discrimination result in the step S6 is YES, a step S7 sets a value "1" at the center of the master station direction flag because its own address is minimum in this case. A step S8 sets the sub station direction flag which indicates the direction in which the sub center unit exists, and sends out the sub station designation status. A step S9 sends out the conference start status and the initial setting ends. The process advances to a step S18 when the discrimination result in the step S6 is NO.

When the discrimination result in the step S3 is NO, a step S10 discriminates whether or not an address is received from another center unit. When the discrimination result in the step S10 becomes YES, a step S11 discriminates whether or not its own address is smaller than the address received from the other center unit. When the discrimination result in the step S11 is YES, a step S12 sends out its own address. On the other hand, a step S13 sends out the address received from the other center unit when the discrimination result in the step S11 is NO.

A step S14 discriminates whether or not the transmission and reception of addresses is completed between the center units which are located on both ends of the tandem connection. When the address is only received from the center unit which is located on one end of the tandem connection and the discrimination result in the step S14 is NO, the process returns to the step S10 so as to receive the address from the center unit which is located on the other end of the tandem connection. When the discrimination result in the step S14 is YES, a step S15 compares its own address and the addresses received from the center units which are respectively located on the right and left thereof.

When its own address is smaller than the addresses received from the center units which are respectively located on the right and left thereof, the process advances to the step S7. In this case, its own address is the minimum, and thus, a value "1" is set at the center of the master station direction flag to indicate that this center unit is the master center unit. Thereafter, the initial setting ends after carrying out the steps S8 and S9.

On the other hand, when its own address is greater than the address received from the center unit located on the right thereof in the step S15, a step S16 sets a value "1" on the right side of the master station direction flag, and a step S18 discriminates whether the next received status is the sub station designation status or the conference start status. In the step S15, when its own address is greater than the address received from the center unit located on the left thereof, a step S17 sets a value "1" on the left side of the master station direction flag, and the step S18 is carried out.

When the next received status is the sub station designation status in the step S18, a step S19 discriminates whether or not its own address is smaller than the address of the center unit which relays the sub station designation status. When the discrimination result in the step S19 is YES, a step S21 sets a value "1" at the center of the sub station direction flag and the process returns to the step S18. On the other hand, when the discrimination result in the step S19 is NO, a step S20 relays the sub station designation status and the process returns to the step S18.

On the other hand, when the next received status is the conference start status in the step S18, a step S22 relays the conference start status and the initial setting ends.

Accordingly, the master center unit can be set automatically at the start of the video conference, and the smooth start of the video conference is ensured.

As a modification of the second embodiment, it is possible to initially set the station which invites the video conference as the master station and initially set the sub station from the master station after the tandem connection is made. In addition, after the video conference is started, it is possible to connect a new center unit in tandem via a circuit and connect additional stations which may participate in the video conference. In this case, the added stations are initially regarded as participating stations. Moreover, in addition to displaying the image data from the sub station in the master station and displaying the image data from the master station in the sub and participating stations, it is possible to transmit at the start of the video conference still image data from each of the stations to all stations which will participate in the video conference. In this case, it is possible to display the still image data from all stations in each station.

The second embodiment is advantageous especially when the video conference must be made among distant locations because there is no need to directly connect the distant stations and it is simply necessary to connect the distant center units. As a result, the number of circuits required to make the connection for the video conference among distant stations is minimized.

Further, the present invention is not limited to these embodiments, but various variations and modifications may be made without departing from the scope of the present invention.

What is claimed is:

1. A multi-point conference system for making a video conference comprising:

a center unit including control means and image selector means; and three or more stations respectively coupled to said center unit, each of said stations including at least one camera for picking up an image to output an image data, display means for displaying an image based on an image data and request means for making a request, said control means initially setting master, sub and participating stations inconformance with a predetermined rule, said image selector means automatically supplying the image data from the master station to the sub and participating stations to be displayed on the display means thereof and supplying the image data from the sub station to the master station to be displayed on the display means thereof, said control means automatically setting anew master station in response to a first request from the request means of an arbitrary station requesting the new master station, setting the master station prior to receiving the first request as a new sub-station and setting all stations other than the new master and sub stations as new participating stations.

2. The multi-point conference system as claimed in claim 1 wherein said image selector means automatically supplies the image data from an arbitrary station to the master station in response to a second request from said request means of the master station requesting a display of the image data from said arbitrary station, and said control means in response to said second request automatically sets said arbitrary station as a new sub-station and sets all stations other than the master and the new sub stations as new participating stations.

3. The multi-point conference system as claimed in claim 1 wherein said control means automatically sets a station which is newly coupled to said center unit as a new participating station.

4. The multi-point conference system as claimed in claim 1 wherein said control means in response to the master station disconnecting from said center unit automatically sets the sub-station as a new master station and forcibly sets an arbitrary participating station as a new sub station.

5. The multi-point conference system as claimed in claim 1 wherein said control means in response to the sub-station a disconnecting from said center unit forcibly sets an arbitrary participating station as a new sub station.

6. The multi-point conference system as claimed in claim 1 wherein said request means includes means for manually making a request.

7. The multi-point conference system as claimed in claim 1 wherein each of said stations include a plurality of cameras, and said request means automatically makes said first request when a predetermined one of said cameras is selected.

8. The multi-point conference system as claimed in claim 1 wherein each of said stations include a microphone for picking up a sound to output an audio data and a speaker for outputting a sound based on an audio data, and said request means automatically makes said first request when said microphone picks up the sound continuously for a predetermined time.

9. The multi-point conference system as claimed in claim 1 wherein each of said stations include detection means or automatically detecting that the station is to be regarded as a new master station, and said request means automatically makes said first request in response to a detection made by said detection means.

10. The multi-point conference system as claimed in claim 1 wherein each of said stations include a plurality of cameras, and said control means automatically selects the camera to be used in said master station and/or sub station based on a request from said request means.

11. The multi-point conference system as claimed in claim 1 wherein said control means initially sets the master, sub and participating stations depending on an order with which said stations are turned ON so that a station turned ON first is set as the master station, a station turned ON second is set as the sub station, and one or a plurality of stations turned ON thereafter are set as the participating station.

12. The multi-point conference system as claimed in claim 1 wherein said control means automatically sets a new master station in response to the first request from the request means on the sub or participating station requesting the new master station.

13. The multi-point conference system for making a video conference comprising:
   a plurality of center units, each of said plurality of center units including control means and image selector means;
   a plurality of stations respectively coupled to each of said center units, each of said stations including at least one camera for picking up an image to output an image data, display means for displaying an image based on an image data and request means for making a request; and
   circuits which couple said center units in a tandem connection,
   said control means initially seting master, sub and participating stations in conformance with a predetermined rule,
   said image selector means automatically supplying the image data from the master station to the sub and participating stations to be displayed on the display means thereof and supplying the image data from the sub station to the master station to be displayed on the display means thereof,
   said control means automatically setting a new master stationing response to a first request from the request means of an arbitrary station requesting the new master station, setting the master station prior to receiving the first request as a new sub station and setting all stations other than the new master and sub stations as new participating stations.

14. The multi-point conference system as claimed in claim 13 wherein said controller of said center unit includes means for indicating that the center unit is a master center unit when the master station is coupled thereto and for indicating that the center unit is a sub center unit when the sub station is coupled thereto, said master center unit transmitting the image data from the master station to one or a plurality of center units which are coupled to stations other than the master station, said sub center unit transmitting the image data from the sub station to the master station via the master center unit.

15. The multi-point conference system as claimed in claim 14 wherein an address is assigned to each of said center units and said address is transmitted and received among said center units, said control means initially setting the center unit with a smallest address value as the master center unit and the center unit with a second smallest address value as the sub center unit by comparing the address of the center unit with the address of other center units.

16. The multi-point conference system as claimed in claim 14 wherein said image selector means automatically supplies the image data from an arbitrary station to the master station in response to a second requires from said request means of the master station requesting a display of the image data from said arbitrary station, and said control means in response to said second request automatically sets said arbitrary station as a new sub station and sets all stations other than the master and the new sub stations as new participating stations.

17. The multi-point conference system as claimed in claim 14 wherein said control means automatically sets a station which is newly coupled to said center unit as a new participating station.

18. The multi-point conference system as claimed in claim 14 wherein said control means in response to the master station disconnecting from said center unit automatically sets the sub station as a new master station and forcibly sets an arbitrary participating station as a new sub station.

19. The multi-point conference system as claimed in claim 14 wherein said control means in response to the sub station disconnecting from said center unit forcibly sets an arbitrary participating station as a new sub station.

20. The multi-point conference system as claimed in claim 14 wherein said request means includes means for manually making a request.

21. The multi-point conference system as claimed in claim 14 wherein each of said stations include a plurality of cameras, and said request means automatically makes said first request when a predetermined one of said cameras is selected.

22. The multi-point conference system as claimed in claim 14 wherein each of said stations include a microphone for picking up a sound to output an audio data and a speaker for outputting a sound based on an audio data, and said request means automatically makes said first request when said microphone picks up the sound continuously for a predetermined time.

23. The multi-point conference system as claimed in claim 14 wherein each of said stations include detection means for automatically detecting that the station is to be regarded as a new master station, and said request means automatically makes said first request in response to a detection made by said detection means.

24. The multi-point conference system as claimed in claim 14 wherein each of said stations include a plurality of cameras, and said control means automatically selects the camera to be used in said master station and/or sub station based on a request from said request means.

25. The multi-point conference system as claimed in claim 13 wherein said control means initially yes the master, sub and participating stations depending on an order with which said stations are turned ON so that a station turned ON first is set as the master station, a station turned ON second is set as the sub station, and one or a plurality of stations turned ON thereafter are set as the participating station.

26. The multi-point conference system as claimed in claim 13 wherein said control means automatically sets a new master station in response to the first request from the request means of the sub or participating station request the new master station.

* * * * *

UNITED STATES PATENT AND TRADEMARK OFFICE
CERTIFICATE OF CORRECTION

PATENT NO. : 5,003,532
DATED : March 26, 1991
INVENTOR(S) : Ashida et al.

It is certified that error appears in the above-identified patent and that said Letters Patent is hereby corrected as shown below:

Column 7, line 24, change "5282"

to --52582--;

Column 10, line 16, change "eh"

to --the--;

Column 10, line 37, change "476" to

--46--;

Column 11, line 59, change "a" to --$\underline{a}$--;

Column 13, line 65, change "inconformance"

to --in conformance--;

Column 16, line 50, change "yes" to --sets--.

Signed and Sealed this

Ninth Day of February, 1993

Attest:

STEPHEN G. KUNIN

*Attesting Officer*

Acting Commissioner of Patents and Trademarks